No. 824,344. PATENTED JUNE 26, 1906.
P. J. DURBIN.
EXTENSION ARM FOR SCALES.
APPLICATION FILED FEB. 7, 1906.
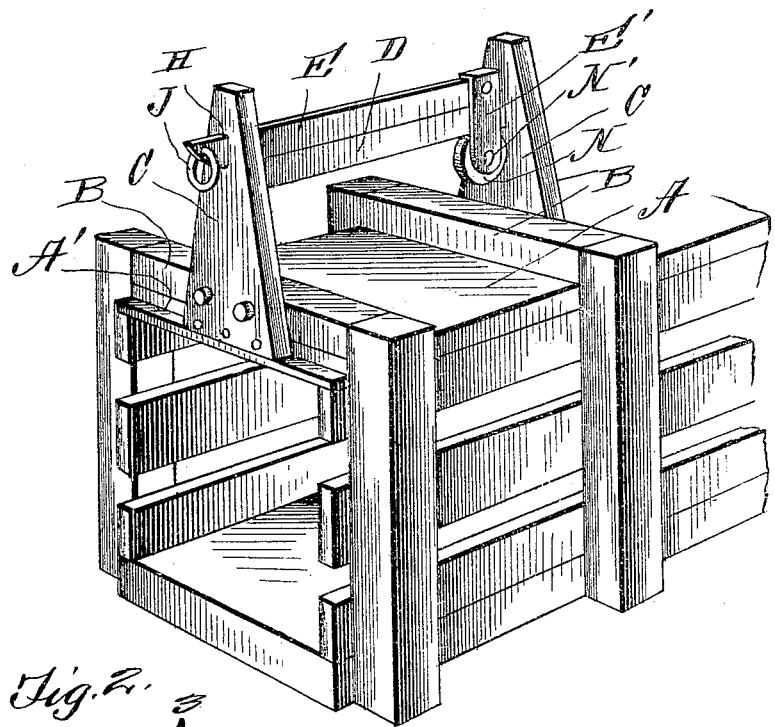
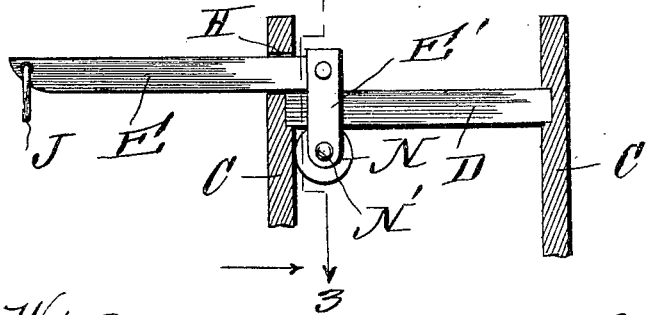
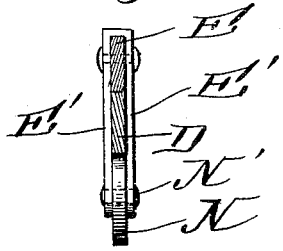
Witnesses
R. A. Boswell
Ada R. Fowler
Inventor
Philip J. Durbin,
By Franklin N. Hough
atty.

UNITED STATES PATENT OFFICE.

PHILIP J. DURBIN, OF PATTON, PENNSYLVANIA.

EXTENSION-ARM FOR SCALES.

No. 824,344.  Specification of Letters Patent.  Patented June 26, 1906.

Application filed February 7, 1906. Serial No. 299,951.

*To all whom it may concern:*

Be it known that I, PHILIP J. DURBIN, a citizen of the United States, residing at Patton, in the county of Cambria and State of Pennsylvania, have invented certain new and useful Improvements in Extension-Arms for Scales; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in extension-arms for supporting scales upon hay-presses; and it consists, essentially, in combination with the top of a press, of standards which are securely held in parallel relation by means of a cross-arm and in the provision of a second bar or arm which is held in contact with the upper surface of the bar connecting the standards and guided in a slot in one of the standards and adapted to be drawn out when desired for use.

The invention consists, further, in other details of construction and arrangements of parts, which will be hereinafter fully described and then specifically defined in the appended claims.

I illustrate my invention in the accompanying drawings, in which—

Figure 1 is a perspective view of my invention. Fig. 2 is a sectional view showing the arm extended, and Fig. 3 is a sectional view on line 3 3 of Fig. 2.

Reference now being had to the details of the drawings by letter, A designates the top of a press having the cleats B secured thereto, and upon shouldered portions A' at the ends of said top are mounted the standards C, which are securely fastened to the upright portions of the shoulders and also to the outer faces of said cross-strips B, being securely held by any fastening means desired.

D designates a bar, preferably of rectangular shape, which is supported at its ends in said standards and securely holding the same in parallel relation. One of said standards is provided with a rectangular-outlined slot H therein for the reception of the extensible bar E, which latter is adapted to rest and travel upon the bar D. The forward end of the bar E is curved slightly, as shown, and provided with a link J, to which a scale may be connected. Said rectangular-outlined aperture is of such a shape as to snugly receive the bar E and allow the latter to have a longitudinal play therethrough. The rear end of the bar E is provided with laterally-projecting bracket-arms E', one upon each side of the bar D, which serve as guides to the bar E in its longitudinal movements, causing said bar E to continually rest upon the under bar D. An antifriction-roller N is journaled upon a pin N', carried by the lower ends of said bracket-arms, and is adapted to contact with the under edge of the bar D as the bar E is moved in one direction or the other, it being noted that when a weight comes upon the outer free end of the bar E there will be a tendency of the antifriction-wheel to draw up in contact with the under edge of the bar D, thereby reducing the frictional contact between the two bars.

From the foregoing it will be noted that by the provision of the apparatus shown and described a simple and efficient means is afforded for securely holding the extension-arm upon a press-top and one which may be readily extended for use when desired.

What I claim is—

1. In combination with a press-top, standards rising therefrom, a bar connecting said standards, an extension-arm adapted to have a longitudinal movement upon the upper edge of said bar and guided through a slot in one of said standards, as set forth.

2. In combination with a press-top, standards rising therefrom, a bar connecting said standards, an extension-arm adapted to have a longitudinal movement upon the upper edge of said bar and guided through a slot in one of said standards, bracket-arms secured to the inner end of said arm and projecting, one upon each side of said bar, and serving as guides, and means for holding said arm in contact with the upper edge of said bar, as set forth.

3. In combination with a press-top, standards rising therefrom, a bar connecting said standards, an extension-arm adapted to have a longitudinal movement upon the upper edge of said bar and guided through a slot in one of said standards, bracket-arms secured to the inner end of said arm and projecting, one upon each side of said bar, and serving as guides, and an antifriction-wheel carried by said bracket-arms and adapted to bear against the under edge of said bar, as set forth.

4. In combination with a press-top, standards rising therefrom, a bar connecting said standards, an extension-arm adapted to have a longitudinal movement upon the upper edge of said bar and guided through a slot in one of said standards, bracket-arms secured to the inner end of said arm and projecting, one upon each side of said bar, and serving as guides, an antifriction-wheel carried by said bracket-arms and adapted to bear against the under edge of said bar, said antifriction-wheel and bracket-arms adapted to contact against said standards to limit the throw of said arms in opposite directions, as set forth.

In testimony whereof I hereunto affix my signature in the presence of two witnesses.

PHILIP J. DURBIN.

Witnesses:
 THOMAS NAGLE,
 J. E. DALE.